United States Patent [19]

Brown et al.

[11] Patent Number: 5,256,056

[45] Date of Patent: Oct. 26, 1993

[54] SELF-CLAMPING MOLD ASSEMBLY

[75] Inventors: Robert L. Brown, Hartville, Ohio; Michael K. Parrent, Welland, Canada; David E. Baxter, Ravenna; John C. White, Cuyahoga Falls, both of Ohio

[73] Assignee: GenCorp Inc., Fairlawn, Ohio

[21] Appl. No.: 751,015

[22] Filed: Aug. 28, 1991

Related U.S. Application Data

[63] Continuation-in-part of Ser. No. 621,675, Nov. 30, 1990, abandoned.

[51] Int. Cl.$^5$ ............................................. B29C 45/66
[52] U.S. Cl. ................................. 425/595; 425/450.1
[58] Field of Search ............ 425/595, 411, 192 R, 425/193, 195, 450.1; 100/918; 249/160, 161

[56] References Cited

U.S. PATENT DOCUMENTS

| | | | |
|---|---|---|---|
| 1,935,794 | 11/1933 | Geyer | 264/297.8 |
| 2,536,120 | 1/1951 | Beare | 264/297.3 |
| 2,790,206 | 4/1957 | Cofek | 264/297.3 |
| 3,005,235 | 10/1961 | Patera | 425/156 |
| 3,308,508 | 3/1967 | Schrenk | 425/190 |
| 3,506,755 | 4/1970 | Rudder | 264/297 |
| 3,638,473 | 2/1972 | McElvoy | 100/918 |
| 3,924,995 | 12/1975 | Crooks et al. | 425/243 |
| 3,973,891 | 8/1976 | Yamada | 425/246 |
| 3,982,869 | 9/1976 | Eggers | 425/246 |
| 4,056,341 | 11/1977 | Moore | 425/411 |
| 4,111,623 | 9/1978 | Black | 425/129 |
| 4,186,161 | 1/1980 | Ulmschneider | 264/37 |
| 4,315,727 | 2/1982 | Black | 425/563 |
| 4,315,885 | 2/1982 | Lemelson | 264/297 |
| 4,352,654 | 10/1982 | Heimberger | 425/545 |
| 4,372,738 | 2/1983 | Black et al. | 425/451.9 |
| 4,403,810 | 9/1983 | Bieneck | 425/589 |
| 4,424,015 | 1/1984 | Black et al. | 425/138 |
| 4,561,626 | 12/1985 | Black | 249/118 |
| 4,575,328 | 3/1986 | Fierkens | 425/126 R |
| 4,604,045 | 8/1986 | Black | 425/575 |
| 4,671,764 | 6/1987 | Hehl | 425/595 |
| 4,693,679 | 9/1987 | Marth | 425/589 |
| 4,790,739 | 12/1988 | Manfridi | 425/192 R |
| 4,877,387 | 10/1989 | Fierkens | 425/116 |
| 4,961,888 | 10/1990 | Brown | 264/40.6 |

OTHER PUBLICATIONS

Frados, *Plastic Engineering Handbook*, 1976, pp. 445-6.
Han, *Rheology in Polymer Processing*, 1976, pp. 284-286.

Primary Examiner—Tim Heitbrink

[57] ABSTRACT

A self-clamping mold assembly for injection molding articles from material cured by the application of temperature and pressure. The assembly includes a mold body and a lock mechanism housed within the body. The body has aligned, independent plates, each having a mold cavity and a lock bore portion with a central axis. The lock mechanism includes a tie rod assembly for engagement with one of the independent plates, and a force generator assembly for engagement with another of the independent plates. The tie rod and force generator assemblies are engaged with the lock bore portion of the plates. The tie rod assembly includes a tie rod adapted for rotatable engagement within the mold assembly, and the force generator assembly includes a lock shaft adapted for locking engagement with the tie rod and a spring biased member retained with respect to the lock shaft. Upon locking engagement of the tie rod with the lock shaft compressing the spring biased member, the independent plates are maintained in clamped condition for the injection of molding material.

17 Claims, 5 Drawing Sheets

SELF-CLAMPING MOLD ASSEMBLY

This is a continuation-in-part of copending application Ser. No. 07/621,675 filed on Nov. 30, 1990 now abandoned.

TECHNICAL FIELD

The present invention relates to a self-clamping mold assembly for the molding of articles, and more particularly to a self-clamping mold assembly for the molding of articles from a material which is cured by the control of temperature and pressure.

BACKGROUND OF THE INVENTION

A variety of mold assemblies are currently available for the molding of articles from materials cured by the control of temperature and pressure. In the past, mold assemblies have consisted of single or multiple cavity, multiple plate molds. The molds were generally pre-heated to a desired temperature, clamped or compressed by an injection mold machine, and then injected with the desired molding material. The injection of the molding material was often accomplished using a injection press. The molding material in the cavity or cavities of the molds was then cured under pressure within the injection press.

The production rate of injection molded articles in molding systems using mold assemblies of the type mentioned above has been increased by the use of conveyors to transport the molds between injection, compression, and heating stations. For example, U.S. Pat. No. 1,935,794 provides a method of molding articles in which the mold is transported by a transfer system between a heating station and a compression station, and maintained under compression during transport through a curing station.

A disadvantage, specifically with respect to molding systems using an injection system having in injection press to apply continued pressure to the mold during both injection and curing of the material, is that the injection press is primarily utilized as a press, rather than as an injector. The use of an expensive injection press for providing pressure to the mold, rather than solely for the injection of material is inefficient, and reduces the overall cost effectiveness of the system.

Another disadvantage of molding systems using past mold assemblies is the high forces or clamping forces required to be applied by the injection system to resist both the operating pressure externally applied to the mold during the injection of material into the mold, and a separation pressure internally applied to the mold as a result of the injection of material and initial curing of the material within the mold. The component of the separation pressure attributed to the injection of material is proportional to the cross-sectional area of the molding cavity. The clamping or resistance force required must be greater than the operating and separation pressures. Thus, as the size of the product to be molded increases, the clamping force required to be applied also increases.

With conventional molds, the separation force generated is a function of the entire exposed or unloaded components forming the internal mold cavity, or the cross-sectional area of the mold cavity. With a self-clamping mold, however, the separation force is only a function of the exposed portions of the mold, and the cross-sectional area of the runners and sprue openings. Thus, prior mold devices required larger clamping forces to be applied by the press, since the molds were not pre-loaded.

A still further disadvantage of conventional molding systems is that the molded articles produced typically require additional processing to remove flash from the articles. The formation of flash, and its removal, result in increased costs due to wasted material, and the additional process of deflashing the article, or removing the excess material, and finishing the article. An additional inspection of each article may also be required, which further increases the overall labor expense of the system.

SUMMARY OF THE INVENTION

The present invention provides a new and improved mold assembly for molding articles from a high grade compound material cured by the application of temperature and pressure. As used herein, the term "cure" is intended to include treatment by the application of either heating or cooling temperatures, cross-linking of the material to be cured, and other material treatments whereby the molding process is completed and the material to be molded attains its finished condition.

The mold assembly of the present invention is a multi-section, self-clamping mold which is preferably used in an automatic nonsynchronous molding system, however, it should be understood that the mold may also be used in synchronous molding systems. During operation of the nonsynchronous system, the mold is first injected with molding material by a material injection system. A transfer system is then used to transport the mold to a curing apparatus for curing the article. The curing process includes processes which change the physical form of the material, e.g. conventional vulcanization, and melting and solidification as in thermoplastic crystallization. Once the molded article is cured, the mold is transported by the transfer system to a mold separator-assembler wherein the mold is unclamped and disassembled into its sections, so that the finished molded article may be removed from a mold section. The empty mold sections are then pre-treated, assembled, and pre-loaded for transport from the mold separator-assembler by the transfer system to a position for production of additional molded articles. A controller system choreographs operation of the injection system for injection of the molding material into the molds, and the proper timed movement of the molds by the transfer system through the material injection press, curing apparatus, and mold separator-assembler to ensure the proper curing of the articles to be molded.

In accordance with the preferred mold assembly of the present invention, the mold assembly includes a body and lock mechanisms housed within the body. The body preferably includes three aligned and independent plates. Each of the plates includes a mold cavity, supporting a mold cavity insert for receiving the molding material, and lock bore portions with a central axis for receiving a lock mechanism. The self-clamping, pre-loaded mold is preferably a single cavity mold, however, molds having different internal configurations may be used with the system, including multiple cavities, to enable the concurrent molding of different parts. The lock mechanisms of the present assembly clamp the plates such that the plates forming the molding cavity are under pressure or pre-loaded, such that the pressures due to injection of the molding material are contained by the mold. Only a runner and/or sprue openings in one plate, which access the molding cavity in the mold are required to be contained or clamped by an external force during the injection operation.

The self-clamping mold is maintained within the injection system for a time sufficient to cure, set or partially cure the material within the runners or sprue openings, by which material is provided to the pressurized or pre-loaded mold cavity. Because the sprue opening or gate is small, the impact of temperature and pressure conditions result in rapid changes to the material at that location. The rapid material changes set the material within the sprue gates to prevent the removal of material or reverse material flow out of the mold. Thus, the self-clamping mold need only be maintained in clamped or compressed position within the injection press of the injection system to cure the material within the sprue openings.

In conventional molding techniques, the injection system or compression press, applies the necessary external force for clamping the mold. Using such conventional techniques, the cross-sectional area of the entire mold cavity is exposed, and the clamping force required due to the injection force component of the separation force is transferred by the mold body to the injection system.

The mold lock mechanisms secure the plates in clamped, pre-loaded condition, arranged in stacked or parallel planar relationship. Each lock mechanism includes a tie rod assembly engaged with one of the plates, and a force generator assembly engaged with another plate. The tie rod and force generator assemblies are engaged within the lock bore portion of each plate. The tie rod assembly includes a tie rod which is rotatable within the tie rod assembly for engagement with the force generator assembly.

The force generator assembly includes a lock shaft which is engaged by the tie rod and a spring biased member. Upon engagement of the tie rod with the lock shaft, the spring biased member is compressed to maintain the plates in clamped condition. In the clamped or pre-loaded condition, the mold plates are under pressure without the use of an external press or other clamping or loading force applied by an injection press.

Prior to injection of material into the mold, the mold is preferably pre-treated with any necessary mold coatings, heated to a desired temperature to assist with curing of the material, or provided with any inserts or other internal elements to be included within the article to be molded. Upon completion of the pre-treatment process, the mold plates are assembled into aligned position and the lock mechanisms are mechanically engaged to clamp sections of the mold together under a force of approximately 6000 pounds, or 3000 pounds per lock mechanism, in the example of the preferred and illustrated embodiment. It should be understood that one or more lock mechanisms may be used which apply any desired force per lock mechanism, as may be needed in the particular molding operation. The mold is then moved into position for engagement with an injection system nozzle for the injection of the molding material.

Other features and advantages of the present invention will become apparent from the following detailed description of the preferred embodiment made with reference to the accompanying drawings, which form a part of the specification.

DETAILED DESCRIPTION OF THE PREFERRED EMBODIMENT

Figure 1:
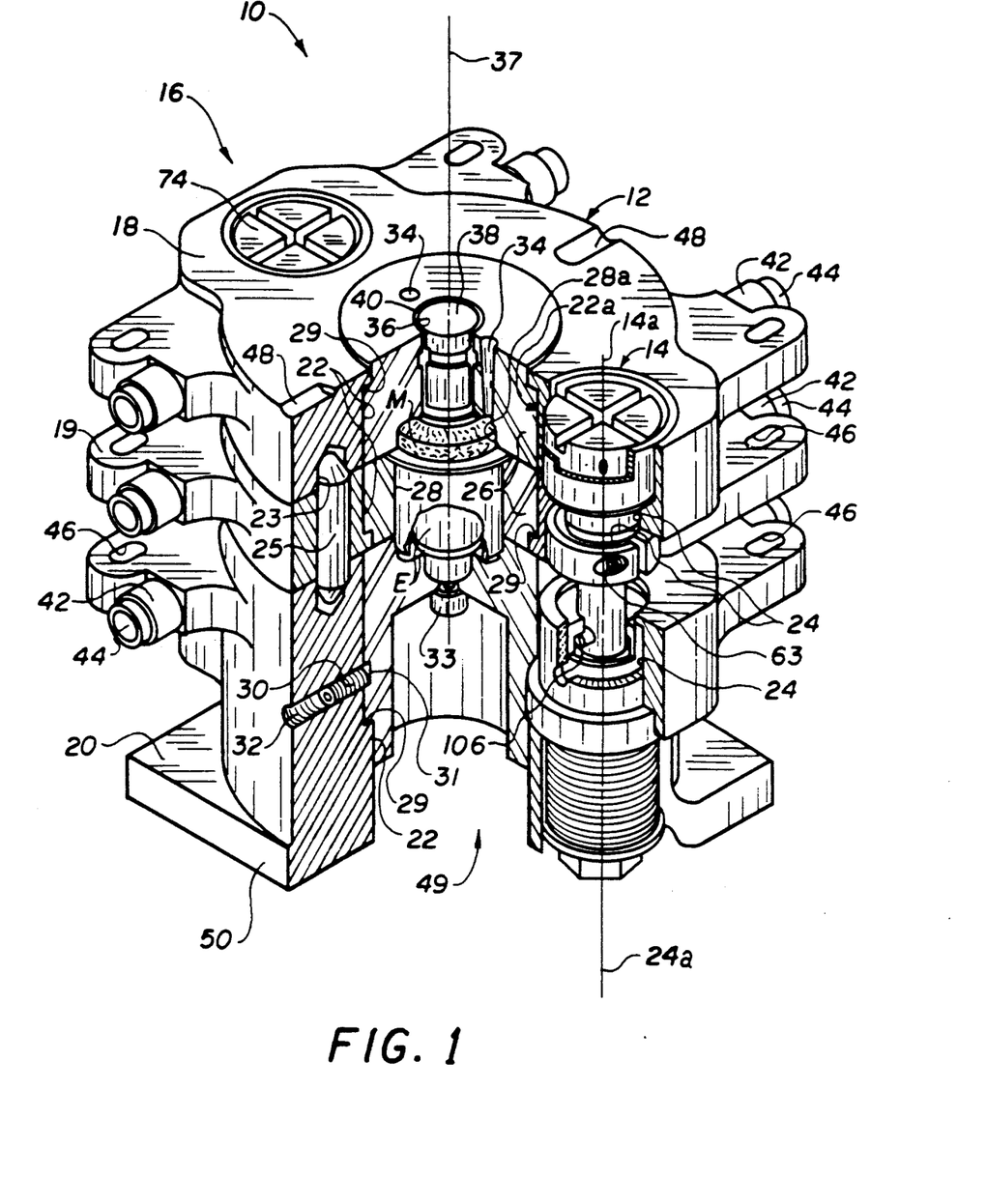
FIG. 1 is a schematic view of a self-clamping mold assembly constructed in accordance with the present invention.

FIG. 1 illustrates a self-clamping mold assembly of the present invention for use during the injection molding of material M cured by the application of temperature and pressure. The assembly, generally referred to at reference numeral 10, preferably includes a mold body 12 and two mold lock mechanisms 14, 16.

The illustrated mold body 12 has three independent plates, a top plate 18, a center plate 19, and a bottom plate 20. The plates are preferably constructed of a cast material, and include a mold cavity portion 22 and a lock bore portion 24 having a central axis 24a. Each of the plates additionally includes an alignment opening 23 for receiving an alignment dowel 25. The dowel 25 is engaged with each of the openings 23 to maintain the plates 18, 19, 20 in aligned position relative to one another.

In the preferred and illustrated embodiment, mold inserts 26 are also provided in the mold cavity portions 22. Although the mold cavity portion 22 in each of the plates forms a mold cavity 22a, and the mold cavity may be used to receive the molding material M, in the preferred embodiment, the mold inserts 26 of each plate are used to form a material cavity 28a for receiving molding material.

Each of the mold inserts 26 includes a seat 29 to support, retain and locate the inserts within its respective mold cavity portion 22, and a material cavity portion 28 for receiving the material M or other elements E to be molded into the product. In the illustrated embodiment, the mold insert 26 of the bottom plate 20 is further secured within its seat 29 by a threaded fastener 30 engaged with an opening 3 in the insert and an opening 32 in the bottom plate. Similar openings and threaded fasteners may be used in the top and center plates to secure their respective inserts. Such fasteners additionally assist with orientation of the mold inserts within their respective plates.

The mold inserts 26 provide the advantage that the desired size, number, or shape of the material cavity 28a can be quickly changed. Damaged cavity portions may also be economically replaced, and many different products may be manufactured using a common style mold body 10.

The top mold plate 18 includes sprue openings or runners 34, which provide a passage for the material M to be provided to the material cavity 28a of the mold 10. Additionally, a central opening 36 and a center pin member 38, engaged within the central opening, are provided. The central opening 36 and pin member 38 have a vertical center axis 37.

Intermediate the center pin member 38 and central opening 36, a layer of semi-rigid material 40, such as bronze impregnated with Teflon (polytetrafluoroethylene), is provided. The intermediate layer 40 enables engagement of the pin member 38 within the central opening 36 by surrounding the pin member with the layer of material and pressing the member and layer into engagement within the central opening 36. Once engaged within the central opening 36, the intermediate layer 40 deforms to a semi-rigid condition, and maintains the member 38 engaged within the opening. The intermediate layer 40 additionally enables axial movement of the center pin member 38 within to engage a rigid element E. This movement compensates for tolerance variation of element E, enables a seal to be provided between the pin member and element E, and thus eliminates flash resulting during injection.

In the illustrated embodiment of FIG. 1, the center pin member 38 engages a rigid element E which is centered within the mold cavity 28a. Rigid elements E may be provided within the material cavity 28a to enable molding of the elements within the product being manufactured. Engagement of the element E with the pin member 38 properly positions and seals the element within the material cavity 28a for molding of the element E into the item being manufactured. A retainer 33 may also be provided for engagement with an opening in the bottom plate 20 to further assist with properly positioning the element E.

Figure 11:
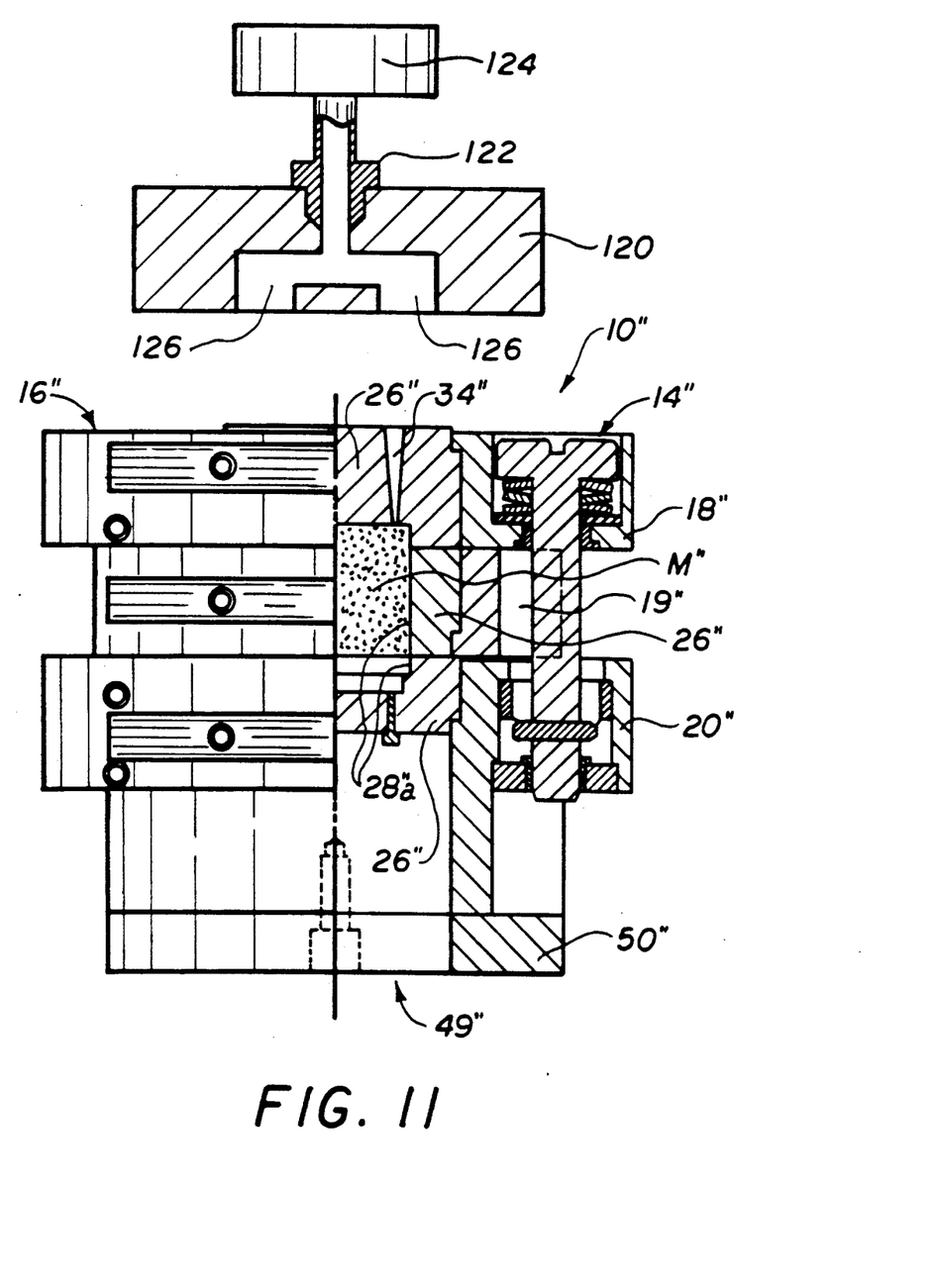
FIG. 11 is a schematic, partial, cross-sectional view of an alternate embodiment of a self-clamping mold assembly of the present invention positioned for engagement by a portion of an injection press of the injection system.

In the event no such elements E are required to be molded into the product, the use of a pin member and center opening may be eliminated. A mold 10" having such an alternate embodiment is illustrated in FIG. 11. As each of the components of the alternate embodiment 10" are substantially similar to the embodiment illustrated in FIG. 1, a double prime designation will be used to reference the components of this alternate embodiment.

In the illustrated embodiment of FIG. 1, each of the mold plates 18, 19, 20 includes plate transport carrier wheels 42, preferably four wheels per plate. The wheels 42 are used during transport of the individual plates 18, 19, 20 between various work stations subsequent to injection of the molding material M. The wheels 42, when used in conjunction with a continuous conveyor or other transfer system, provide rolling contact to move the respective plate in the desired direction. Thus, when used in conjunction with a conveyor system, the plates are capable of substantially parallel horizontal movement.

In the preferred embodiment, the transport wheels 42 are secured on cast bosses by bumpers 44 extending from each plate. The bumpers 44 function to maintain mold position relative to the transfer system, while maintaining transport wheel 42 contact, preventing excessive plate rotation or angular movement, and preventing excessive lateral movement.

Additionally, transport coupling notches 46 are also provided on each plate adjacent the bumpers 44. As shown in FIG. 1, the coupling notches 46 are positioned on the corners of each plate, and may be used for engagement by an external actuator for moving the plate and/or plates in a horizontal direction.

The mold plates additionally include one or more plate locating detents 48. As illustrated in the top plate 18 of FIG. 1, the detents 48 provide a means for positively locating and positioning the mold 10 for treatment, engagement with an external actuator for desired movement and engagement with other transportation systems.

The mold insert 26 of the bottom plate 20 of the mold body includes a precision base opening 49 and a rectangular shaped precision base portion 50. Using either or both of the precision opening 49 or base portion 50, the mold assembly 10 may be readily transferred between necessary process stations. The precision opening 49 and portion 50 allow economical transfer systems such as conveyors to be employed to transport the mold assembly 10.

Turning now to FIGS. 2-10, a first embodiment of the components of the lock mechanisms 14, 16 of the mold assembly 10 are illustrated. As the first and second lock mechanisms 14, 16 of this embodiment are identical, only the first mechanism 14 will be discussed in detail, and the components of the second lock mechanism 16 will be referred to by the same reference numerals used in connection with the first lock mechanism 14.

Additionally, although the use of two lock mechanisms 14, 16 is illustrated, the number and size of lock mechanisms used may be determined by one of ordinary skill in the art in light of the design of the product to be manufactured; the geometry of the product, including its cross-sectional area and physical shape; and the characteristics of the material M used, such as viscosity changes or chemical reactions under various temperature and pressure conditions.

The mold lock mechanism 14 of FIG. 1 has a central axis 14a aligned with the central axis 24a of the lock bore portion 24 when the lock mechanism is engaged with the mold assembly 10. The lock mechanism 14 includes a tie rod assembly 52 and a force generator assembly 54. Upon axial movement of the tie rod assembly 52 into engagement with the force generator assembly 54 as in FIG. 1, the lock mechanism 14 of the embodiment clamps the plates 18, 19, 20 under a force of approximately 3,000 pounds. The lock mechanisms 14, 16 are thus used to pre-load the components of the mold assembly 10 with a desired pressure, and thereby apply the necessary force to prevent separation of the mold plates 18, 19, 20 and associated inserts 26 during and after the injection of material M.

Figure 2:
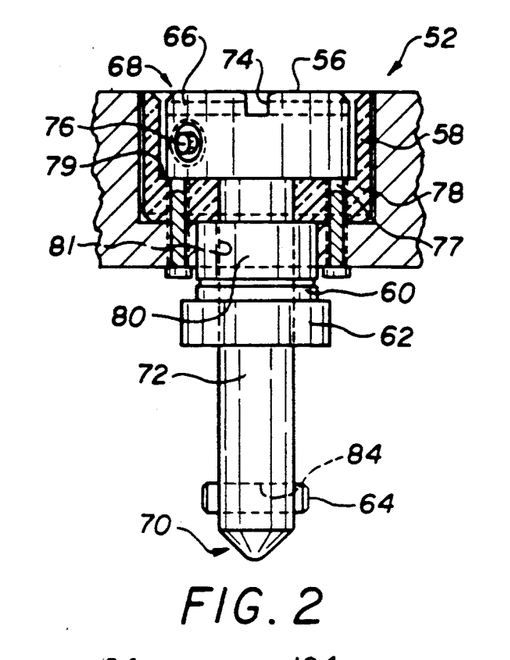
FIG. 2 is a partial, cross-sectional view of the tie rod assembly illustrated in FIG. 1.

FIG. 2 schematically illustrates the locking tie rod assembly 52. The tie rod assembly 52, engaged with the top plate 18, includes a tie rod 56 rotatably engaged within the assembly, a tie rod bearing 58, a thrust washer 60, a retainer 62 and a locking pin 64.

The tie rod 56 transfers the force created by the force generator assembly to clamp the plates 18, 19, 20 of the mold assembly 10. It further enables mold assembly, disassembly and engagement with adjacent mold plates. The tie rod 56 includes a head portion 66 on one end 68 thereof, the locking pin 64 on a conically shaped second end 70 thereof, spaced from the one end 68, and a shaft 72 intermediate the ends 68, 70. The second end 70 is conically shaped for ease of engagement of the tie rod 56 during automated assembly of the mold 10. The shaft 72 is engaged through tie rod bearing 58 and supports the retainer 62, which is a locking retaining collar secured surrounding the shaft.

Figure 3:
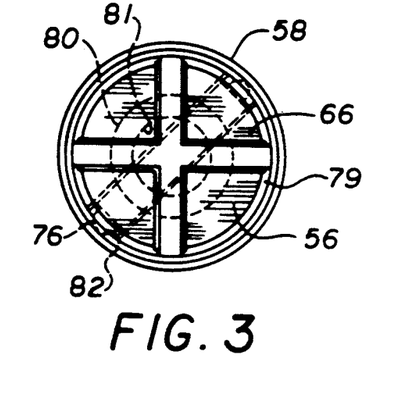
FIG. 3 is a top view f the tie rod assembly shown in FIG. 2.

The head portion 66 is rotatably engaged within the tie rod bearing 58, and additionally includes key slots 74 and spring biased ball detents 76. As best shown in FIGS. 2 and 3, the key slots are provided to enable rotation of the tie rod 56 by an actuator into engagement with the force generator assembly 54. The conventional ball detents 76 are provided for aligning the tie rod 56 in spring biased engagement with the tie rod bearing 58. Such engagement resists rotation of the tie rod 56 when it is in the unlocked or unloaded position, aligned for engagement with the force generator assembly 54.

The tie rod bearing 58 is a stepped cylindrical bearing for aligning the assembly 52 within the lock bore portion 24, and to assist with positioning of the tie rod 56. The tie rod bearing 58 is seated within the lock bore portion 24 of the top plate 18, and includes a cup shaped portion 78 with an internal bearing surface 79 for engagement with the head portion 66 of the tie rod 56, and a base portion 80 having a central opening 81 therethrough for engagement by the shaft 72 of the tie rod. The bearing 58 may be fastened to the mold lock bore portion 24 of the top plate using conventional fasteners engaged through threaded openings 77 provided through the bearing surface 79 of the cup portion 78. The ball detents 76 of the tie rod 56 are engaged within openings or depressions 82 formed in an internal surface of the cup portion 78 to maintain the position of the tie rod 56 when the assembly 10 is in aligned an unclamped condition, as described above.

The tie rod thrust washer 60 is positioned along the shaft 72 of the tie rod abutting the base portion 80 of the tie rod bearing 58 on one side, with the retainer or retaining collar 62 on the other side. The washer 60 prevents movement of the tie rod 56 in the direction of the central lock mechanism axis 14a.

The retaining collar 62 is clamped to the tie rod shaft 72 by a conventional fastener 63. The collar 62 works in combination with the tie rod thrust washer 60, tie rod 56, and tie rod bearing 58 to position the tie rod and prevent axial movement in a direction along the central lock mechanism axis 14a.

The locking pin 64 on the second end 70 of the tie rod 56, engages the force generator assembly 54. Upon engagement between the tie rod 56 and force generator assembly 54, the plates 18, 19, 20 of the mold assembly 10 are in clamped condition. The locking pin 64 is engaged through an opening 84 formed in the second end 70 in a direction transverse to the central lock mechanism axis 14a, and extending outwardly from the shaft 72 on both sides thereof.

Figure 4:
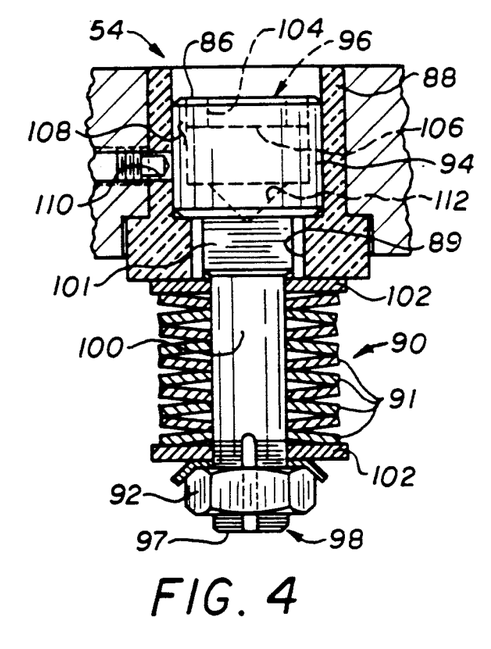
FIG. 4 is a partial cross-sectional view of the force generator assembly.
Figure 5:
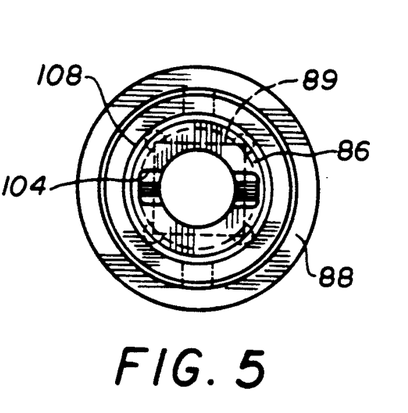
FIG. 5 is a top view of the force generator assembly shown in FIG. 4.

FIGS. 4 and 5 schematically illustrate the force generator assembly 54 of the mold assembly 10. The force generator assembly 54 includes a non-rotating lock shaft 86, a locking bearing 88 having a square shaped opening 89 for receiving the lock shaft, a spring biased member 90 and a retainer 92. In the illustrated embodiment of FIG. 4, the retainer 92 is a conventional nut. The force generator assembly 54 is engaged within the lock bore portion 24 of the bottom plate 20.

The lock shaft 86 engages the tie rod 56 during engagement of the assemblies 52, 54 to provide clamped engagement between the plates 18, 19, 20. The lock shaft 86 includes a container 94 on one end 96, with the threaded retainer 92 removably engaged with threads 97 on a second end 98 of the lock shaft 86, and a support shaft 100 intermediate the ends 96, 98. A portion 101 of the support shaft 100 adjacent the container 94 is substantially square in cross-section, while the remainder of the shaft has a cylindrical cross-section.

Figures 6, 7, 9, 10:
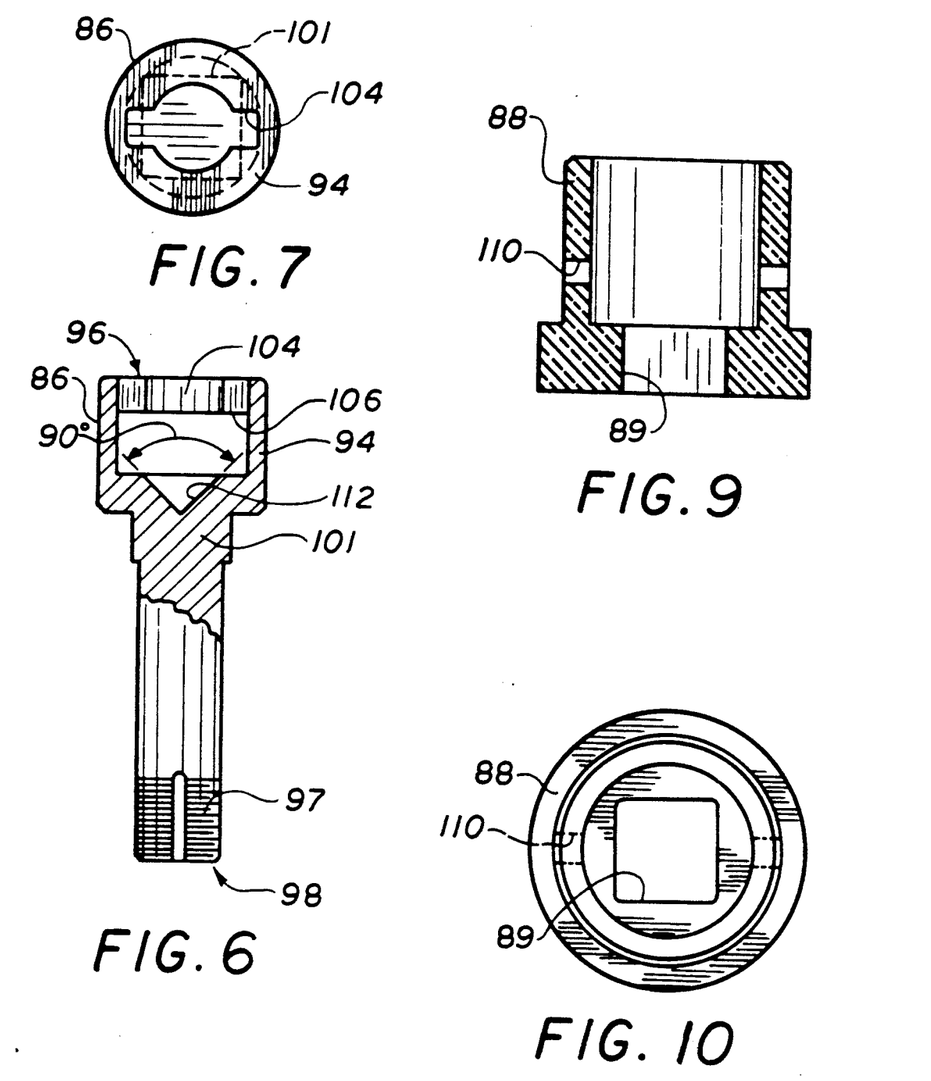
FIG. 6 is a partial, cross-sectional view of the lock shaft of the force generator assembly.
FIGS. 7 and 8 are top and bottom views, respectively, of the lock shaft illustrated in FIG. 6.
FIG. 9 is a cross-sectional view of the lock shaft bearing of the force generator assembly.
FIG. 10 is a top view of the lock shaft bearing of FIG. 9.
Figure 8:
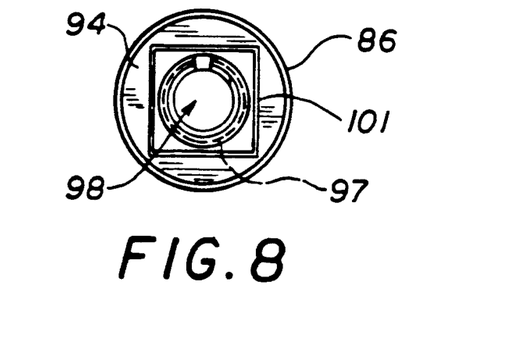

The container 94 on the one end 96 of the lock shaft 86 includes a slot opening 104 therein, and a lock surface 106 within the container adjacent the slot opening. The slot opening has a key-shaped cut out configuration, and the non-cut out portions are provided with the lock surface 106 adjacent the slot opening 104, for locking engagement with the tie rod locking pin 64.

During engagement of the lock shaft 86 within the lock bearing 88, surface 108 of the lock shaft container 94 engages the lock shaft bearing 88. The square cross-sectional portion 101 of the shaft 100 is also through the bearing opening 89 in the bearing 88, to prevent rotation of the lock shaft 86. The lock shaft bearing 88 may also be secured to the bottom mold plate 20 via a conventional fastener engaged through openings 110.

To engage the tie rod and force generator assemblies 52, 54, the non-rotating lock shaft 86 is engaged by the tie rod 56. The key-shaped opening 104 in the lock shaft container enables access into the container 94 by the locking pin 64 of the tie rod 56. A conical recess 112 is provided in the container 94, for mating engagement with the conical shaped second end 70 of the tie rod.

The shaft 100 of the lock shaft is engaged through the opening 89, and supports the spring biased member 90. In the illustrated embodiment of FIG. 4, the spring biased member 90 is a plurality of commercial spring washers 91, of a size to obtain sufficient spring resistance to thereby generate the desired spring force during compression of the washers, engagement of the assemblies 54, 56 and movement of the plates to the clamped condition.

The spring washers 91 are positioned along the shaft 100 of the lock shaft between conventional washers 102, and the washers 91 and 102 are prevented from removal from the shaft by the retainer 92. The retainer 92 is additionally used to pre-load the spring washers 91 with the desired pressure. In the event it is necessary to change defective spring washers or replace spring washers to generate a different force, the retainer 92 may be readily removed, and the desired spring washers, or other spring biased members, engaged along the shaft 100. Engagement of the retainer 92 with the lock shaft threads 97 ensures continued spring washer tension.

Locking engagement of the tie rod 56 with the lock shaft 86, as in FIG. 1, is provided upon the application of force to the tie rod by an actuator device (not illustrated). As set forth in application Ser. No. 07/621,675, an actuator device, such as an hydraulic cylinder, engages the key slots 74 of the head portion 66 and may apply a force as great as 5,000 pounds in the direction of the central axis 14a of each lock mechanism 14, 16.

Figure 12:
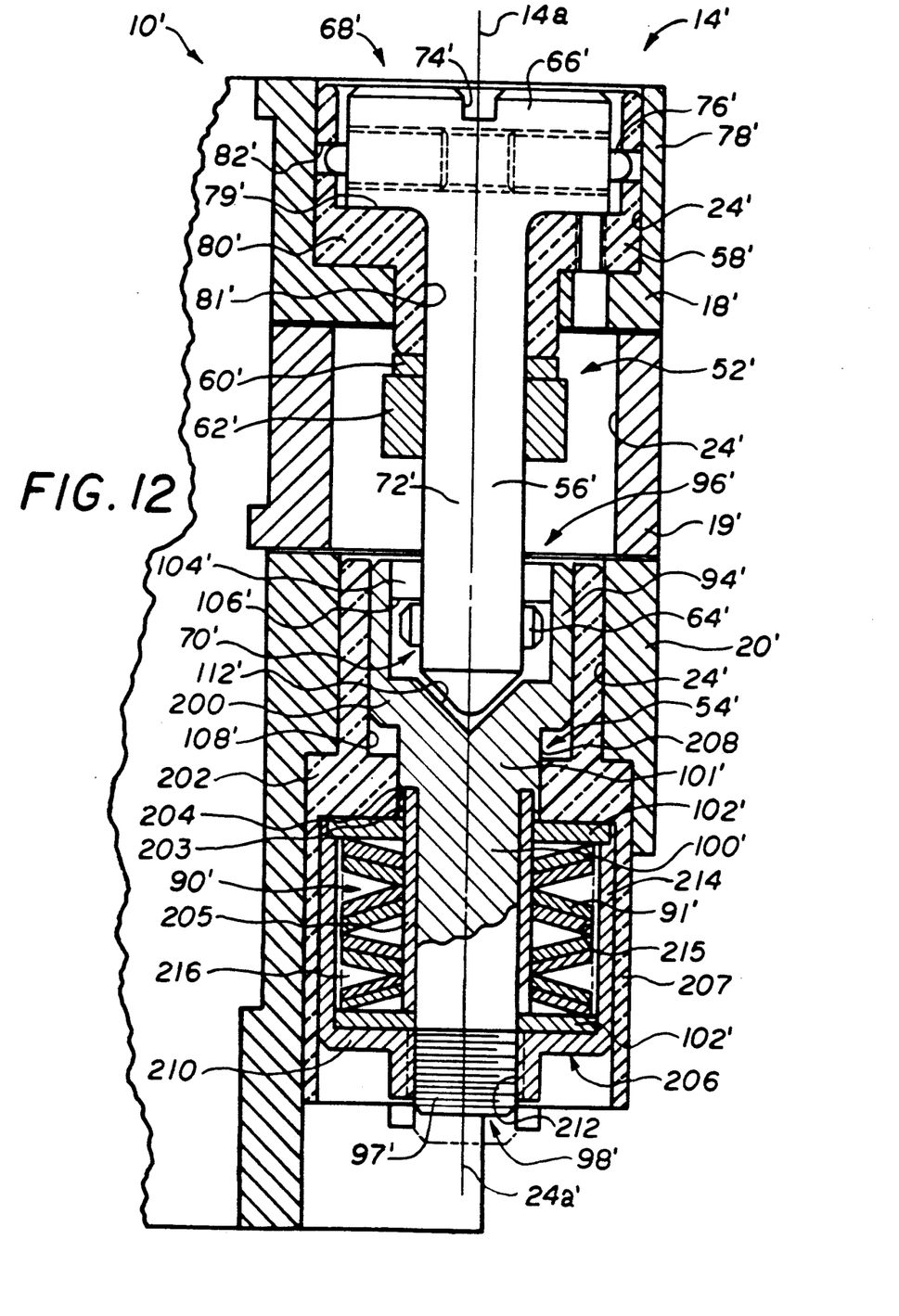
FIG. 12 is a schematic, partial, cross-sectional view of another alternate embodiment of a lock mechanism of a self-clamping mold assembly of the present invention.

Turning now to FIG. 12, a second embodiment of the lock mechanism 14' of the mold assembly 10' is illustrated. As the second embodiment of the lock mechanism has components substantially similar to those previously described, the similar components will be referred to using the same reference numerals, but with a single prime designation. Only the differences between this preferred embodiment and the previous embodiment will be discussed in further detail.

The tie rod assembly 52' is substantially as shown in FIGS. 2 and 3. As illustrated in FIG. 12, the tie rod assembly is engaged with and through the top and middle plates 18', 19', respectively. The tie rod 56' is shown in position aligned for engagement with the force generator assembly 54'.

Various components of the force generator assembly 54' differ from those of the first embodiment, and include the non-rotating lock shaft 200, a locking bearing 202 having a cylindrical opening 203 with flat surfaces 204 for receiving the lock shaft, a spring biased member 90' supported on a wear sleeve 205 and a retainer 206. The locking bearing 202 additionally includes an extended cylindrical flange 207, such that upon engagement of the shaft and bearing, the shaft is substantially surrounded by the bearing 202.

The lock shaft 200 engages the tie rod 56' to provide clamped engagement between the plates 18', 19', 20'. The lock shaft 200 includes a container 94' on one end 96', and a threaded retainer 206 removably engaged with threads 97' on a second end 98' of the lock shaft 200. A support shaft 100' is provided intermediate the ends 96', 98'. A wear sleeve 205 is engaged over the intermediate support shaft 100'. A portion 101' of the support shaft 100' adjacent the container 94' is cylindrical with flat surfaces 208 forming a square in cross-sectional configuration, while the remainder of the shaft 100' has a cylindrical cross-section.

The threaded retainer 206 comprises a cup 210 with a threaded opening 212 for engagement with the lock shaft, and a cylindrical flange 214 extending therefrom in the direction of the lock shaft container 94'. The outside diameter of the cylindrical flange 214 of the cup retainer is sized to be slidably engaged within the internal diameter of the cylindrical flange 207 of the bearing 202.

During engagement of the lock shaft 200 within the locking bearing 202, a surface 108' of the lock shaft container 94' engages the lock shaft bearing 202. The flat surfaces 208 of the shaft 100' are also engaged with the flat surfaces 204 of the opening 203 in the bearing 202, to prevent rotation of the lock shaft 200. The shaft 100' of the lock shaft and adjacent wear sleeve 205 support the spring biased member 90'.

In the embodiment of FIG. 12, as in FIG. 4, the spring biased member 90' is a plurality of commercial spring washers 91'. The wear sleeve 205 acts as an inner fixed stop for the spring washers 91'. The spring washers 91' are positioned along the shaft 100' and wear sleeve 205 between conventional washers 102', and the washers 91', 102' are prevented from removal from the shaft by the bearing 202 and retainer cup 210. As illustrated, the extended flanges 207, 214 are engaged such that the retainer cup 210 is within the bearing 202, and the washers 91', 102' are captured within a chamber 216 formed by the extended flanges 207, 214. The flange 214 of the retainer 206 additionally provides a fixed stop so that the spring washers 91' do not over compress. The inner surface 215 of the flange 214 also bears any side pressure during compression of the washers 91'.

To engage the tie rod and force generator assemblies 52', 54', the lock pin 64' of the tie rod 56' is aligned with and engaged through the key opening 104' of the lock shaft 200. The conical recess 112' in the container 94' is then engaged with the conical shaped second end 70' of the tie rod. Using an actuator device to apply a force to the tie rod along the central axis 14a, the lock shaft and bearing compress the spring washers 91'.

In the embodiments illustrated in FIGS. 1, 11 and 12, upon locking engagement of the tie rod with the lock shaft, the spring biased members of each lock mechanism are compressed to a minimum of approximately 50%, and preferably to 75% in the illustrated examples. At these compression levels, the combination of two lock mechanisms places the mold plates under a force of approximately of 6000 pounds, or approximately 3000 pounds per lock mechanism, in the examples shown in the application.

The application of pressure by an actuator device compresses the spring washers 91, 91' and engages the aligned second end 70, 70' and locking pin 64, 64' of the tie rod through the key opening 104, 104' of the lock shaft container 94, 94'. Thereafter, the actuator applies a torque to the tie rod 56, 56' to move the locking pin 90 degrees out of alignment with the key opening 104, 104' and into locking engagement with the lock surface 106, 106'. Once engaged with the lock surface, the second end 70, 70' of the tie rod 56 remains engaged with the lock shaft container 94, 94'.

With the tie rod and force generator assemblies 52, 54, 52', 54' thus maintained in locking engagement, the spring biased member 90, 90' of the preferred and illustrated embodiments is compressed to the desired percentage of its normal condition, and maintains the mold plates together in clamped condition. In clamped condition, the forces generated by the lock mechanisms 14, 16, 14', 16' are transferred to the mold body and mold inserts 26, 26'. By clamping the mold body components under forces as great as 6,000 pounds, the internal pressures generated during and after injection of the molding material M which tend to separate the plates and mold inserts 26, 26' are unsuccessful. In the event the lock mechanisms 14, 16, 14', 16' do fail to overcome the separation forces, or are unsuccessful at maintaining the plates and mold inserts in clamped condition, the result may be poorly cured or defective products, or flash on the items being manufactured, which must then be removed.

In the past, mold assemblies without clamping mechanisms were required to be externally clamped within an injection press during the injection and curing of the molding material. Such external clamping was required to overcome the forces tending to separate the mold body, and to cure the molding material. The level of external force required to be applied by such injection presses was proportional to the cross-sectional area of the material cavity of the mold receiving molding material.

The self-clamping mold assembly 10, 10', 10" of the present invention enables a reduction in both the time the mold is required to be maintained within the injection press, and in the level of force required to be externally applied to the mold. Specifically, since the material cavity portions 28, 28', 28" of the mold inserts 26, 26', 26" and plates are pre-loaded by the lock mechanisms under a desired pressure generated by the force generator assembly, only the open mold areas such as the runners or sprue openings 34, 34" are required to be contained or pressurized by an external clamping force while in the injection system.

The mold assembly 10" schematically illustrated in FIG. 11 is in a position for injection by a runner plate 120 of an injection press of an injection system. A still further third embodiment of the lock mechanism 14" is illustrated in FIG. 11, which operates similarly to the embodiments previously described. Reference numerals with a double prime designation refer to components similar to those described in the prior embodiments.

The runner plate 120 is engaged with a nozzle 122 of the press supplied with material M" by an injector 124, and an interconnected extruder (not illustrated). Once the runner plate 120 is engaged with the top plate 18" of the mold, the nozzle 122 may supply the runners 34" with material M" via openings 126 in the runner plate.

As the runners 34" are substantially smaller in cross-sectional area than the material cavity 28a", the required clamping forces are accordingly reduced, as well as the time required to maintain the mold within the injection system to initiate the curing of material within the runners. Typically, the present invention reduces the necessary clamping force applied by the injection system by a factor of 4, such that where a force of 4,000 pounds was previously required during the injection of material into a conventional mold, a force of only 1,000 pounds would be required for the self-clamping mold assembly 10, 10', 10" of the present invention.

The preferred form of the apparatus has been described above. However, with the present disclosure in mind it is believed that obvious alterations to the preferred embodiment, to achieve comparable features and advantages in other assemblies, will become apparent to those of ordinary skill in the art.

We claim:

1. A self-clamping mold assembly for receiving molding material comprising,
a body and a lock mechanism housed within said body,
said body having at least two aligned, independent plates, each plate having a mold cavity portion and a lock bore portion with a central axis, and each mold cavity portion of each independent plate together forming a material cavity,
said lock mechanism including a tie rod assembly for engagement with one of said independent plates, and a force generator assembly for engagement with another of said independent plates, said tie rod and force generator assemblies engaged with said lock bore portion of said plates,
said tie rod assembly having a tie rod rotatably engaged within said assembly,
said force generator assembly having a lock shaft positioned for locking engagement with said tie rod and a spring biased member retained with respect to said lock shaft, whereby upon rotation of said tie rod into locking engagement with said lock shaft compressing said spring biased member, said independent plates are maintained in clamped condition and form said material cavity for receiving molding material.

2. The self-clamping mold assembly of claim 1 wherein said tie rod assembly includes a tie rod and a bearing, said tie rod adapted for rotatable engagement within said bearing, said bearing is seated within said bore portion of one of said independent plates.

3. The self-clamping mold assembly of claim 1 or 2, wherein said force generator assembly includes a lock shaft having a slot opening for engagement with said tie rod, a locking bearing, a spring biased member and a retainer, said spring biased member maintained in engagement against said locking bearing by said retainer, whereby upon locking engagement of said tie rod with said lock shaft, said spring biased member is compressed approximately 50%.

4. The self-clamping mold assembly of claim 3, wherein said tie rod of said tie rod assembly includes a head portion on a first end thereof rotatably engaged within said tie rod bearing, a locking pin on a second end thereof spaced from said first end, and a shaft intermediate said spaced ends engaged with said tie rod bearing.

5. The self-clamping mold assembly of claim 4, wherein said lock shaft of said force generator assembly includes a container on a first end thereof engaged within said lock shaft bearing, a retainer removably engaged on a second end of said lock shaft spaced from said first end of said container, and a support shaft intermediate said spaced ends engaged with said lock bearing and supporting said spring biased member.

6. The self-clamping mold assembly of claim 5, wherein said lock shaft container of said force generator assembly includes said slot opening therein, and further includes a lock surface within said container adjacent said slot opening for locking engagement by said tie rod locking pin.

7. The self-clamping mold assembly of claim 6 wherein said tie rod and force generator assemblies each have a central axis aligned with said lock bore portion axis such that said tie rod and lock shaft of said respective assemblies are aligned with said lock bore portion axis, whereby upon axial movement of said tie rod engaging said locking pin with said lock surface, said lock mechanism clamps said independent plates under a force of approximately 3,000 pounds.

8. The self-clamping mold assembly of claim 7 wherein said tie rod includes a spring biased detent having an axis transverse to said central axis of said tie rod assembly, and engaged within an opening in said bearing to maintain said tie rod in an aligned position for engagement of said tie rod locking pin through said slot opening in said lock shaft.

9. The self-clamping mold assembly of claim 1 wherein said body further includes a mold insert seated within each of said mold cavity portions formed by said independent plates to said material cavity for receiving molding material when said mold is in said clamped condition.

10. The self-clamping mold assembly of claim 9 wherein each of said independent plates includes a mold insert seated within said mold cavity portion, said mold inserts together forming said material cavity, one of said mold inserts having an opening enabling molding material to be supplied to said material cavity, a central opening and a center pin member having vertical center axis engaged within said central opening surrounded by an intermediate membrane enabling axial movement of said center pin member within said central opening along said vertical center axis.

11. A self-clamping mold assembly for receiving molding material comprising,
a body and first and second lock mechanisms housed within said body,
said body having at least two independent plates, each plate having an aligned dowel opening and first and second lock bore portions, said body further having a plate alignment dowel engaged within said dowel openings to maintain the aligned position of said independent plates relative to one another, said independent plates together forming a mold cavity in such aligned position, each of said lock mechanisms including a tie rod assembly for engagement with one of said independent plates, and a force generator assembly for engagement with another of said independent plates, said tie rod and force generator assemblies engaged with said lock bore portions in said plates, said tie rod assembly having a tie rod rotatably engaged within said assembly, said force generator assembly having a lock shaft positioned for locking engagement with said rotatable tie rod and a spring biased member retained on said lock shaft, whereby upon rotation of said tie rod into locking engagement of said tie rod with said lock shaft and compression of said spring biased member, said independent plates are maintained in clamped condition for receiving molding material.

12. The self-clamping mold assembly of claim 11 wherein said mold plates include at least one plate locating detent for alignment of said mold during the injection of molding material.

13. The self-clamping mold assembly of claim 12 wherein each of said independent plates includes a plurality of transport carrier wheels having side guide bumpers.

14. The self-clamping mold assembly of claim 13 wherein said plates further include a plurality of transport bumpers having coupling notches.

15. A self-clamping mold assembly for receiving molding material comprising, a body and first and second lock mechanisms housed within said body, said body having at least two independent plates, each plate having an aligned dowel opening and first and second lock bore portions, said body further having a plate alignment dowel engaged within said dowel openings to maintain the position of said independent plates relative to one another, said independent plates together forming a mold cavity in such aligned position, said body further having a mold insert seated within said mold cavity formed by said independent plates, said mold insert including a material cavity for receiving molding material, each of said lock mechanisms including a tie rod assembly for engagement with one of said independent plates, and a force generator assembly for engagement with another of said independent plates, said tie rod and force generator assemblies engaged with said lock bore portions in said plates, said tie rod assembly having a tie rod supported for rotation within said assembly, said force generator assembly having a lock shaft positioned for locking engagement with said tie rod and a spring biased member retained on said lock shaft, whereby upon rotation of said tie rod into locking engagement of said tie rod with said lock shaft and compression of said spring biased member, said independent plates are maintained in clamped condition for receiving molding material.

16. The self-clamping mold assembly of claim 15 wherein said mold insert comprises mold insert portions engaged with each of said independent plates seated within said mold cavity, said mold insert portions within said independent plates together forming said material cavity for receiving material.

17. The self-clamping mold assembly of claim 16, wherein one of said mold insert portions includes an opening enabling molding material to be supplied to said material cavity, a central opening and a center pin member having a vertical center axis engaged within said central opening surrounded by an intermediate membrane enabling axial movement of said center pin member within said central opening along said vertical center axis.

* * * * *